United States Patent
Moroney

Patent Number: 6,039,434
Date of Patent: Mar. 21, 2000

[54] THRESHOLDED UNDERCOLOR REMOVAL AND BLACK REPLACEMENT IN A THERMAL-INKJET PRINTER OR PLOTTER

[75] Inventor: Nathan Moroney, Barcelona, Spain

[73] Assignee: Hewlett-Packard Company, Palo Alto, Calif.

[21] Appl. No.: 08/810,752

[22] Filed: Mar. 4, 1997

[51] Int. Cl.[7] .............................. B41J 2/21; B41J 2/145; B41J 2/15

[52] U.S. Cl. ............................... 347/43; 347/41; 395/117

[58] Field of Search ................................ 347/43, 41, 74, 347/15; 358/298, 447, 448; 395/117, 109, 134

[56] References Cited

U.S. PATENT DOCUMENTS

| | | | |
|---|---|---|---|
| 5,483,625 | 1/1996 | Robertson et al. | 395/117 |
| 5,519,815 | 5/1996 | Klassen | 395/109 |
| 5,563,985 | 10/1996 | Klassen et al. | 395/109 |
| 5,574,832 | 11/1996 | Towery et al. | 395/109 |
| 5,642,474 | 6/1997 | Parkhurst et al. | 395/117 |
| 5,848,225 | 12/1998 | Nickell et al. | 395/109 |

*Primary Examiner*—N. Le
*Assistant Examiner*—Thinh Nguyen

[57] ABSTRACT

Gray component or undercolor in an input image is quantitatively determined, and reduced in amounts nonlinearly related to the quantity of undercolor. The reduced and added signals are applied to control printing by, preferably, scanning inkjet printheads. The total undercolor inking is a substantially monotonic function of the quantity of undercolor. Preferably the reducing and adding are performed in a subtractive-colorant color space, e.g. CMYK space. Preferably image data is initially accepted or generated in terms of additive RGB signals, and these are converted into the subtractive domain. Preferably the reducing and adding means operate only above an undercolor threshold of about twenty to thirty-five percent; and total inking is made between one hundred fifty and two hundred fifty percent when the signals are all gray component. Initial very gradual increases from a threshold are important, for consistent, smooth, regularized dynamic-response in tonal gradations. Preferably these increases follow a spline function. The system works in virtually the same way for black input as chromatic input. Corresponding method and apparatus modules characterize the invention. Automatic operating instructions for the apparatus (or method) modules are stored. Results include minimizing ink usage, consistent with an optimal black, and nearly linearizing composite grays.

19 Claims, 12 Drawing Sheets

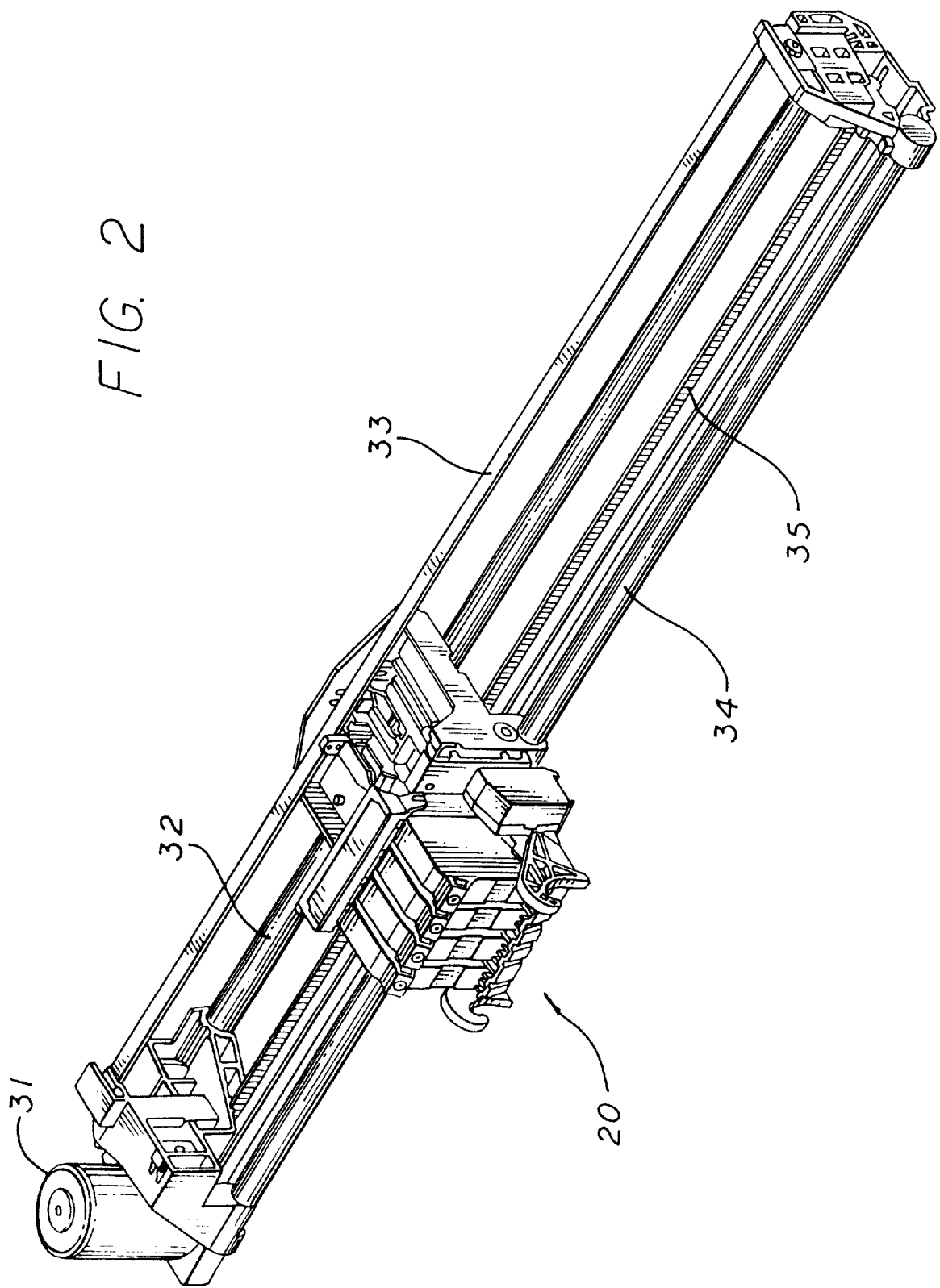

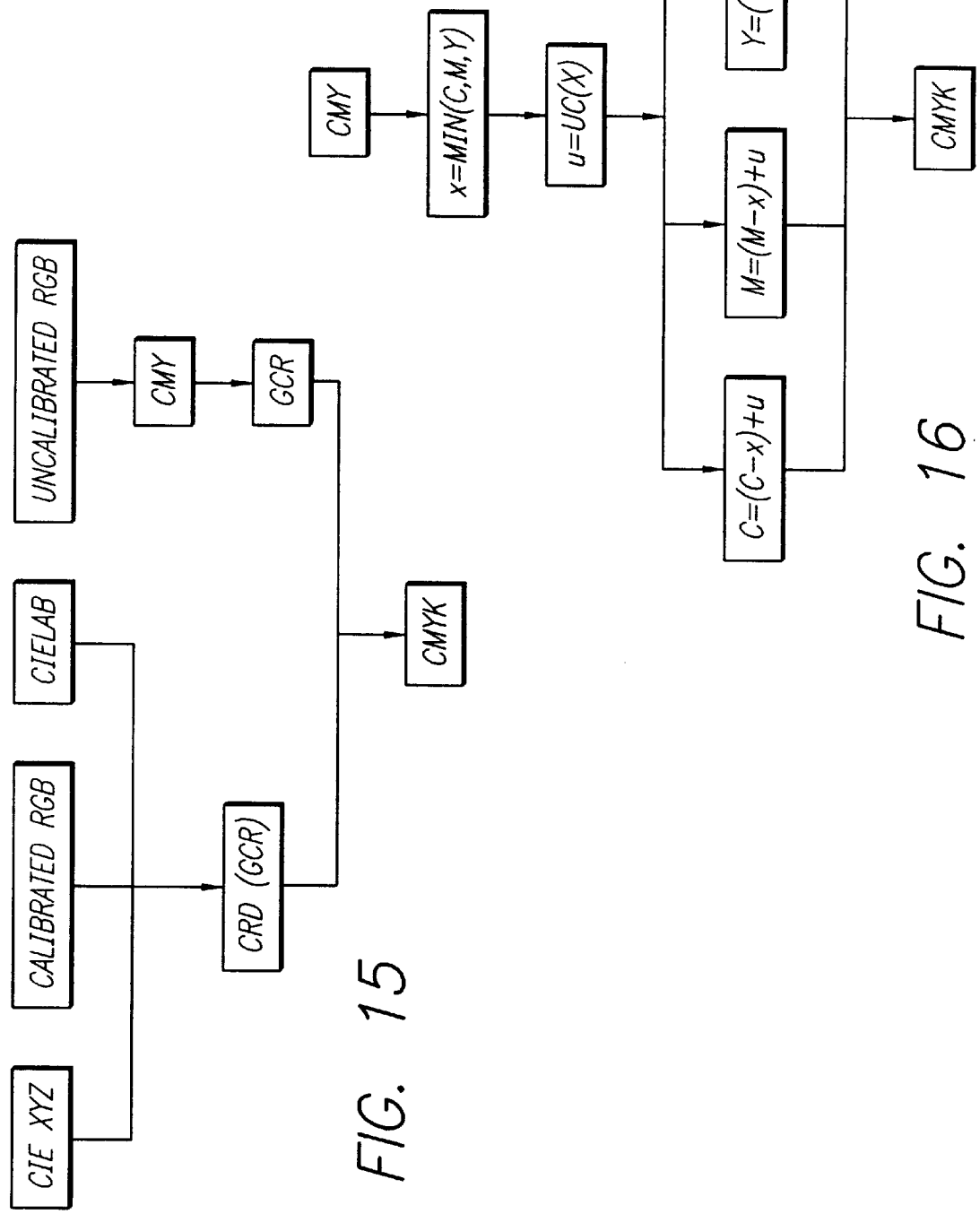

THRESHOLDED UNDERCOLOR REMOVAL AND BLACK REPLACEMENT IN A THERMAL-INKJET PRINTER OR PLOTTER

RELATED PATENT DOCUMENTS

Closely related documents include coowned U.S. Pat. No. 5,377,024 of Dillinger, entitled "METHOD FOR FORMING COLOR IMAGES USING A HUE-PLUS-GRAY COLOR MODEL"; 5,473,446 of Perumal and Dillinger, entitled "COLOR DIGITAL HALF-TONING USING BLACK AND SECONDARY COLOR REPLACEMENT AND COLOR VECTOR DITHERING"; and U.S. Pat. No. 5,402,245 of Motta et al., entitled "BI-LEVEL DIGITAL COLOR PRINTER SYSTEM EXHIBITING IMPROVED UNDERCOLOR REMOVAL AND ERROR DIFFUSION PROCEDURES"—all hereby incorporated by reference in their entirety into this document.

FIELD OF THE INVENTION

This invention relates generally to machines and procedures for printing color text or graphics on printing media such as paper, transparency stock, or other glossy media; and more particularly to a scanning thermal-inkjet machine and method that construct color text or images from individual ink spots created on a printing medium, in a two-dimensional pixel array. The invention refines undercolor removal and replacement thresholding techniques to optimize image quality and ink volume vs. operating time.

BACKGROUND OF THE INVENTION (a) Undercolor removal for image quality—It is well known that three subtractive color primary inks, if printed in superposition, should in purest principle combine to form black. (The most common subtractive primary colors are cyan, magenta and yellow—constituting the "CMY" color space or system.) It is almost equally well known that real subtractive color primaries when superposed produce an off-black that to some observers is sometimes muddy-looking and otherwise undesirable.

Many workers' reports, including the Dillinger patent mentioned above, have pointed out that this effect, sometimes perceived as undesirable, can be avoided by substituting a true black ink for the common fraction of three subtractive primaries—that fraction sometimes being known as "undercolor". Such substitution has been implemented in various ways in numerous products.

(b) Undercolor removal for liquid control—To achieve vivid colors in inkjet printing with aqueous inks, and to substantially fill the white space between addressable pixel locations, ample quantities of ink must be deposited. Doing so, however, requires subsequent removal of the water base—by evaporation (and, for some printing media, absorption)—and this drying step can be unduly time consuming.

In addition, if a large amount of ink is put down all at substantially the same time, within each section of an image, related adverse bulk-colorant effects arise: so-called "bleed" of one color into another (particularly noticeable at color boundaries that should be sharp), "blocking" or offset of colorant in one printed image onto the back of an adjacent sheet with consequent sticking of the two sheets together (or of one sheet to pieces of the apparatus or to slipcovers used to protect the imaged sheet), and "cockle" or puckering of the printing medium. Various techniques are known for use together to moderate these adverse drying-time effects and bulk- or gross-colorant effects.

One known way to reduce the amount of liquid deposited on a page, in the course of printing an image, is to substitute black ink for a common fraction of three superposed subtractive primaries. This strategy is particularly useful and important in one special case in which liquid deposition is particularly heavy—namely, when deep shadow areas of an image occupy large areas of a printed sheet, calling for relatively very large amounts of colorant.

This substitution strategy is actually the same substitution mentioned in subsection (a) above, in regard to an arguable improvement of color appearance. Hence the substitution of one black inkdrop for three chromatic subtractive primaries provides two quite separate, recognized benefits simultaneously.

(c) Undercolor balance for richer shadows—To some observers, however, a composite black is sometimes richer and deeper than a black produced by printing with black ink. At any rate it is particularly useful when used as an add-on to black ink, since black ink alone produces a visual effect that is not opaque enough—or in graphics jargon not "snappy" enough—for a critical eye. The color inks are available anyway in a color printer, and can be used to augment the opacity of black ink.

Thus it is known to retain some undercolor black in addition to solid black ink—giving a total amount of inking that is, for instance, up to three hundred or even four hundred percent of "full inking". In other words, at each pixel of an image region that is so treated such a known system may deposit an average of three or four inkdrops.

To deposit "an average of three" drops, it is possible to print one drop of black and for example on the average two-thirds of a drop of each of three subtractive chromatic primaries. This can be accomplished, for instance, by printing one drop of all three of those chromatic inks in two out of every three pixels throughout the region.

In inkjet printing, such inking produces a desirably dense black effect but does suffer from the drawback of depositing a large amount of liquid on the page. One existing product which operates in this way is discussed in subsection (e) below.

(d) Undercolor balance for dithered image quality—In the above-mentioned Perumal and Dillinger patent, moreover, it is also shown that under some circumstances substitution of black ink for superposed color inks can amount to too much of a good thing. In particular when black inkdrops are distributed sparsely in a region of a printed image, they produce a distinctly grainy, harsh appearance which is often—depending on the subject matter of the illustration—undesirable.

This grainy appearance also may give the misimpression that the printing device which formed the image on a printing medium is not capable of fine resolution. For these various reasons Perumal and Dillinger teach a technique for replacing black inkdrops with matched quantities of three subtractive color inks—in other words, precisely the opposite of the black substitution discussed above.

In their patent, the point of departure is assumed to be an input data set expressed in terms of the hue-plus-gray color space taught in the Dillinger patent. In that way of representing colors, at the outset it is a given that as much undercolor black as possible is expressed strictly in terms of black inkdrops.

The teaching of Perumal and Dillinger moderates this approach, providing a softer, smoother image texture in relatively lightly printed areas, because it replaces each widely-scattered dead-black inkdrop with three less-widelyscattered color inkdrops. Because the drops are still somewhat widely scattered, a viewer tends not to notice the chromatic character of these drops.

Perumal and Dillinger go still further, also replacing secondary inkdrops with individual primary drops—thereby yet further distributing the inking in terms of area. In their process the black component of the color vector is replaced first (leaving secondary components for replacement only if additional replacement is feasible) because, as their patent puts it, the black dots are "darker and therefore more offensive with respect to attempting to represent continuous tone in the lighter shades."

In the Perumal patent, however, the techniques disclosed have the effect of making the black-to-color (and secondary-to-primary) substitution only in areas where the darker inkdrops would otherwise be scattered somewhat sparsely, which is to say in highlight areas of an illustration. Deep shadow areas are left rendered by black (and secondary) ink, according to the teachings of Perumal et al., who teach a novel method which they call "dithering on a color vector".

Dithering is a rendition technique often regarded as best adapted to images that have relatively large or simple image-element structures, or indeed to business graphics and like illustrations characterized by solid blocks or fields of color. Thus the Perumal method of establishing a consistent undercolor strategy for both shadow and highlight regions is most suited for illustrations that have extensive solid-color fields or at least lack important fine detail.

Moreover, the Perumal method of dithering on a color vector is useful mainly, or entirely, in systems that are designed according to the hue-plus-gray scheme and that therefore do have color vectors—with pure-black components—on which to dither. Working in a nonCMY color space, Perumal applies a replacement of gray and secondary colors that is linear; this latter constraint means that some significant black replacement by undercolor occurs even in somewhat dark shadow regions, whereas a significant amount of black ink is allowed to remain even in highlights.

(e) Undercolor balance with dither, in products—In one established product of the Hewlett Packard Company, undercolor removal 152 (FIG. 12, upper left view) is provided only when the undercolor fraction k, plotted along the abscissa, is about sixty percent; and the removal fraction 152 increases at first very slowly for another ten percent or so. Undercolor removal exceeds twenty percent only after the undercolor fraction passes about eighty or eighty-five percent, so that it is in fact confined strongly to the deepest gray shades—and for such regions the amount of undercolor removal and corresponding black generation increases very rapidly with increasing undercolor fraction.

The fraction of undercolor removed 152 may be compared with the total amount 151 present, and also with remainder 154–156 (lower left view). The latter curve represents what is left after the removed fraction 152 is subtracted from the total 151, and as can be seen it has three distinct features: a long segment 154 ascending at nearly the rate of the initial total undercolor 151, followed by a peak 155, and finally a more abruptly descending tail 156.

Thus the remainder 154–156 does not always increase or decrease as the undercolor fraction k increases—such behavior would be called monotonic; rather it sometimes increases and sometimes decreases. This characteristic is due to the interplay between the linearly rising total undercolor 151 and the removed fraction 152—which starts much later but then increases rapidly.

Black generation 153, shown in the upper right view in comparison with the initially present total undercolor 151, is derived separately. This amount 153 of black to be added appears also in comparison with the remaining undercolor 154–156.

Since the remaining undercolor 154–156 and the newly generated black 153 are both to be printed, their sum 157–159 (lower right view) is of particular interest. It represents the total amount of ink that will go down on the printing medium.

What is noteworthy here is, first, that the total inking 157–159, too, fails to be monotonic. In fact, due to the interplay between the peak of the remainder curve 154–156 and the black curve 153 sharply rising in the same region—skewing the sum to the right—the total inking 157–159 has a peak 158 which is even sharper than that in the remainder curve 154–156.

Also of note is the vertical scale in the lower right view, ranging not from zero to unity as in the other views but rather from zero to three. The total initial undercolor 151 in this graph accordingly appears much shallower, since the combined inking approaches three hundred percent of normal (I.e., single-dot inking)—before falling back off nearly to two hundred percent.

In physical terms these graphed data thus represent a printing system that routinely uses almost three inkdrops per pixel, but not in the darkest shadows—rather in a region of lesser shadow intensity around seventy-five to ninety percent initial undercolor. Such a system, though capable of quite excellent performance, is susceptible in particularly dark regions to overinking problems of the sort discussed earlier.

Equally or more serious is its possible susceptibility to nonlinear perceptual effects, particularly if ink-and-printing-medium interactions do not proceed exactly as contemplated in design. In such cases the perceived darkness or blackness of what is printed on the medium may actually be greater at the seventy-five-to-ninety-percent undercolor level than at one hundred percent, or indeed at any level above ninety percent.

In other words, what should be midshadow tones may appear darker than what should be deepest-shadow tones. Perceptible lightening may occur where regions of an image should appear darkest, so that such regions instead appear lighter than the immediately adjacent areas that are—by the logic or the illustration—less deeply shaded.

This susceptibility to reentrant or nonmonotonic tonal scaling arises partly from the nonmonotonic total inking 157–159. It arises more particularly from the fact that the peak 158 of the total-inking function is sharply contoured, and is narrowly and awkwardly sandwiched between two confining features: (1) a rather high threshold for initiation of undercolor removal—at about sixty percent, as previously noted for the upper left view in FIG. 14—and (2) the rightward-skewing black-generation function 153, which rises most rapidly starting at about seventy-five percent.

Once again, the difficulty discussed here is only a susceptibility. In practical operating environments, however, it can take on the appearance of a seemingly temperamental response to what should be minor perturbations such as ink or paper batches, atmospherics etc.

(f) Undercolor balance with error diffusion—Other artisans have disclosed an approach which serves when more photograph-like images are involved—I.e., when the input image is a continuous-tone illustration. In such a case the rendition technique preferred for maintaining resolution, and for avoiding the distinct patterning that often accompanies dither techniques, is known as "error diffusion".

The above-mentioned patent of Motta et al. teaches an approach to undercolor treatment which is integrated into a following rendition stage that employs error diffusion. Accordingly their method is more suited to continuous-tone images—particularly such images with details that might be blurred or eradicated by a dither technique.

In a preferred implementation of the Motta technique, no undercolor removal occurs—and the amount 253' of black ink $K_{out}$ used remains at zero—unless and until the undercolor fraction or in Motta's phrase "gray component" reaches a point $GC_1$ (FIG. 13) said to be 105/255 of full black, or about forty-one percent. Starting at that gray-component (undercolor) value the amount 253 of black ink $K_{out}$ used to represent gray increases (from zero) quite abruptly.

It thereafter continues rather steeply to a point at which it joins and follows the forty-five-degree identity line 251 (corresponding to the total initial undercolor 151 in FIG. 12), at about ninety percent undercolor and above. Beyond that point all black is represented 253" by black ink $K_{out}$.

In general the Motta approach appears to work very well and to provide a major stride forward in the art of inkjet printing, and accordingly it is not intended to criticize the worthwhile innovations of Motta et al. Still it may be mentioned that their system would seem possibly susceptible to an overly abrupt onset of the undercolor replacement in negotiating the sharp corner in the response curve at $GC_1$—and this in a midrange of grays where any abrupt change in coloration characteristics may be particularly noticeable to a critical eye. Moreover, that teaching is limited to the error-diffusion environment.

In addition, if the Motta data are analyzed in the same manner as the earlier-product data of FIG. 12 discussed in subsection (e) above, it may be seen that the Motta system too may be strongly nonmonotonic in total inking, and with an even more abrupt response anomaly near the top of the darkness scale. More specifically, Motta's total-inking response would appear to rise linearly to about fifty percent of normal inking—at about forty percent of initial undercolor—and then to traverse a tall hump in the response, to about one hundred seventy percent of normal ink at roughly sixty to eighty percent of initial undercolor.

The inking response would next fall to about one hundred five percent of normal ink at ninety-two percent initial undercolor—but then rise linearly to about one hundred ten percent of total ink at one hundred percent of initial undercolor. The total-ink curve thus has not one but two reversals, the second being quite sharp.

Accordingly, while the system when properly tuned by inks, papers etc. should perform excellently, and in particular should be very well behaved as to tonal response, it may be susceptible to seemingly erratic behavior in perhaps extraordinary circumstances not all parameters are strictly in accordance with design specifications. Under such conditions, as explained in subsection (d) above, a non-monotonic total-inking function, and particularly a relatively narrow or sharp one, may yield nonmonotonic perceptual response.

(g) Conclusion—As can now be seen, the art of inkjet printing has heretofore not attained an ideal balance between reliable enjoyment of the benefits of undercolor replacement with black, in deep-shadow regions, and the drawbacks of such replacement in highlight regions. Such an ideal balance has been particularly elusive for operating modes that do not employ error diffusion, or systems that do not adhere to the hue-plus-gray paradigm and therefore are not amenable to dithering on a color vector. Thus important aspects of the technology used in the field of the invention remain amenable to useful refinement.

SUMMARY OF THE DISCLOSURE

The present invention introduces such refinement. In its preferred embodiments, the present invention has several aspects or facets that can be used independently, although they are preferably employed together to optimize their benefits.

In preferred embodiments of a first of its facets or aspects, the invention is apparatus for printing images on a printing medium by scanning inkjet printheads. The apparatus includes some means for receiving image data expressed as signals for at least chromatic colors.

For purposes of generality and breadth in describing and discussing the invention, these means will be called the "receiving means". Like all the other means introduced below, the receiving means operate automatically.

Also included are some means for determining a quantity of undercolor, if any, in the image. Again for breadth and generality these will be denominated the "determining means".

The apparatus also includes some means for reducing the chromatic-color signals and adding a signal for black, in amounts nonlinearly related to the quantity of undercolor. These will be called the "reducing and adding means". In addition the apparatus includes means for holding such printheads and translating them across the printing medium.

Further the apparatus in this first aspect of the invention includes some means for applying the reduced and added signals to control printing by the printheads. The reducing and adding means cooperate with the applying means, in such a way as to produce total undercolor inking that is a substantially monotonic function of the quantity of undercolor.

The foregoing may constitute a description or definition of the first facet of the invention in its broadest or most general form. Even in this general form, however, it can be seen that this aspect of the invention significantly mitigates the difficulties left unresolved in the art.

In particular, by maintaining a substantially monotonic relationship between undercolor present and total undercolor inking, the invention has the potential for eliminating or at least reduces to a very minimum the kinds of illogical tonal relationships discussed earlier, in the "BACKGROUND" section of this document.

Although this aspect of the invention in its broad form thus represents a significant advance in the art, it is preferably practiced in conjunction with certain other features or characteristics that further enhance enjoyment of overall benefits.

For example, it is preferred that the apparatus also include storage means for holding automatic operating instructions for all of the previously mentioned means. Preferably the reducing and adding means operate only above an undercolor threshold of about twenty to thirty-five percent.

Preferably the reducing and adding means cooperate with said applying means to produce total inking between one hundred fifty and two hundred fifty percent when the signals are all undercolor. Preferably the receiving means can receive a monochrome image, expressed as equal signals for three subtractive primary colors; and the reducing and adding means operate upon the monochrome image in the same way as a color image.

Numerous other preferences are introduced in the "DETAILED DESCRIPTION" section.

In preferred embodiments of a second of its aspects, the invention is apparatus for printing images on a printing medium by scanning inkjet printheads. The apparatus includes receiving, determining, and reducing and adding means; and also holding and applying means—all generally as defined above for the first aspect.

Further, the reducing and adding means of this second facet of the invention cooperate with the applying means to produce total inking between one hundred fifty and two hundred fifty percent of nominal full inking, when the signals are all undercolor.

The foregoing may represent a definition or description of the second aspect of the invention in its most general or broad form. Even in this form, however, it can be seen that this facet of the invention resolves important difficulties of the art. For instance the total inking at full undercolor is in a highly desirable range.

On one hand, it is well above the one hundred ten percent that may be expected with the Motta system—too low to provide the undercolor boost needed by black ink for a "snappy" or very deep shadow black. On the other hand it is also well below the liquid-overloading levels of three or four hundred percent of normal inking obtained with the earlier product analyzed with respect to FIG. 12.

Although this second aspect of the invention in its broad form thus represents a significant advance in the art, it is preferably practiced in conjunction with certain other features or characteristics that further enhance enjoyment of overall benefits. For example, most of the preferences mentioned above for the first main facet or aspect of the invention are applicable here as well.

In preferred embodiments of a third basic aspect or facet, the invention is a method for printing images on a printing medium by scanning inkjet printheads. The method includes the steps of automatically receiving image data, expressed as signals for at least chromatic colors; and automatically determining a quantity of undercolor, if any, in the image.

It also includes automatically reducing the chromatic-color signals and adding a signal for black, in amounts related to the quantity of undercolor, without dithering on a color vector; and automatically applying the reduced and added signals to control printing by the printheads.

In this method, the reducing and adding steps cooperate with the applying step to begin undercolor-signal removal and black-signal addition with initially very gradual increases, from a threshold that does not exceed about thirty-five percent undercolor.

While the foregoing may represent a description or definition of the third basic facet or aspect of the invention in its broadest or most general form, nevertheless the invention even as thus broadly couched importantly mitigates limitations of the prior art. Thus for example by operating from a thirty-five percent undercolor threshold the invention does not unduly defer the onset of undercolor replacement as in the FIGS. 12 and 13 systems discussed in the "BACKGROUND" section.

On the other hand by using a threshold, relatively high though it is, the invention avoids needless injection of linearly introduced black inkdrops in highlight areas. Furthermore by employing a gradual increase at the outset, the invention avoids seemingly abrupt changes in tonal dynamics such as seen in the Motta system at the discontinuity or corner $GC_1$.

Nevertheless as in the earlier-discussed aspects of the invention there are some preferable features or characteristics. For example it is preferable that the initial gradual increases follow a spline function.

All of the foregoing operational principles and advantages of the present invention will be more fully appreciated upon consideration of the following detailed description, with reference to the appended drawings, of which:

BRIEF DESCRIPTION OF THE DRAWINGS

FIG. 2 is a like view of a carriage and carriage-drive mechanism which is mounted within the case or cover of the FIG. 1 device;

FIG. 15 is a diagram showing gray-component removal implementations using multidimensional lookup tables for calibrated or CIE-based color spaces, and one-dimensional tables for uncalibrated red, green and blue (RGB) inputs;

FIG. 16 is a flow chart showing how the present invention processes an undercolor fraction x using two lookup tables (UC[x] and BG[x]) to derive CMYK values for use in printing;

DETAILED DESCRIPTION OF THE PREFERRED EMBODIMENTS

1. BIDIRECTIONAL HIGH-RESOLUTION COLOR PRINTING WITH AT LEAST PARTIALLY ALIGNED PENS

Figure 1:
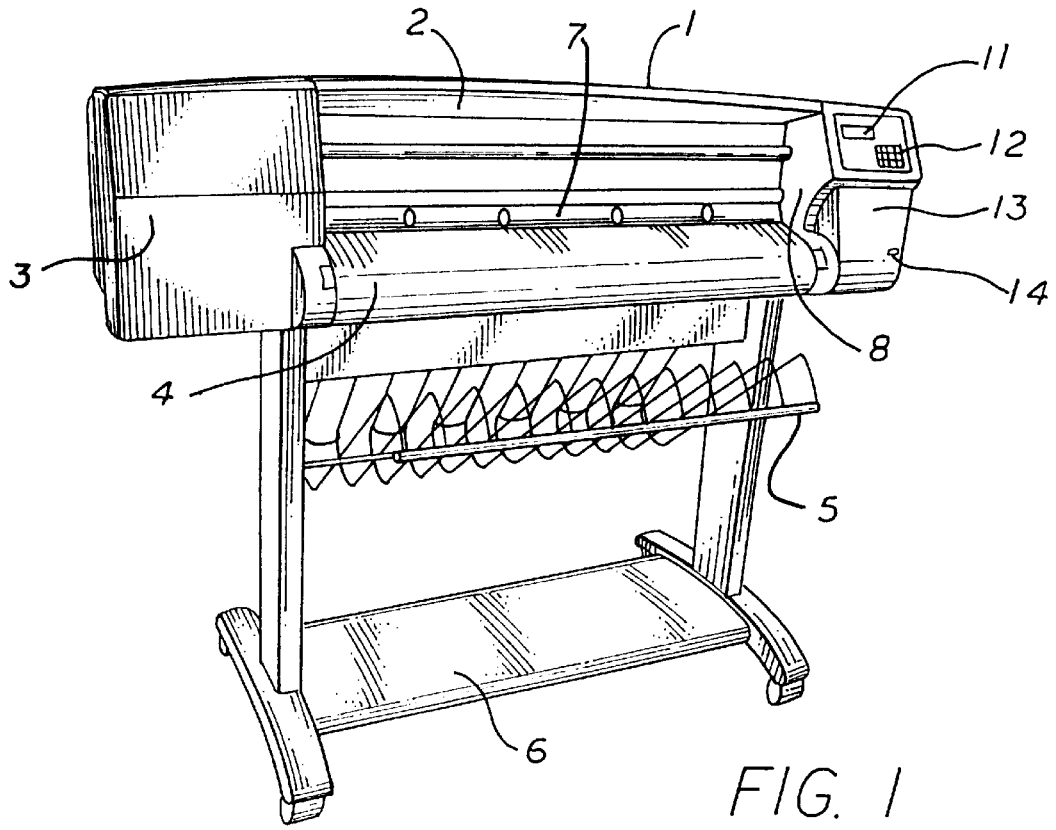
FIG. 1 is an isometric or perspective exterior view of a large-format printer-plotter which is a preferred embodiment of the present invention.

A preferred embodiment of the present invention is a high-resolution color printer/plotter that prints bidirectionally. The printer/plotter includes a main case 1 (FIG. 1) with a window 2, and a left-hand pod 3 that encloses one end of the chassis. Within that pod are carriage-support and drive mechanics and one end of the printing-medium advance mechanism, as well as a pen-refill station with supplemental ink cartridges.

The printer/plotter also includes a printing-medium roll cover 4, and a receiving bin 5 for lengths or sheets of printing medium on which images have been formed, and which have been ejected from the machine. A bottom brace and storage shelf 6 spans the legs which support the two ends of the case 1.

Just above the print-medium cover 4 is an entry slot 7 for receipt of continuous lengths of printing medium 4. Also included are a lever 8 for control of the gripping of the print medium by the machine.

A front-panel display 11 and controls 12 are mounted in the skin of the right-hand pod 13. That pod encloses the right end of the carriage mechanics and of the medium advance mechanism, and also a printhead cleaning station. Near the bottom of the right-hand pod for readiest access is a standby switch 14.

Figure 1A:
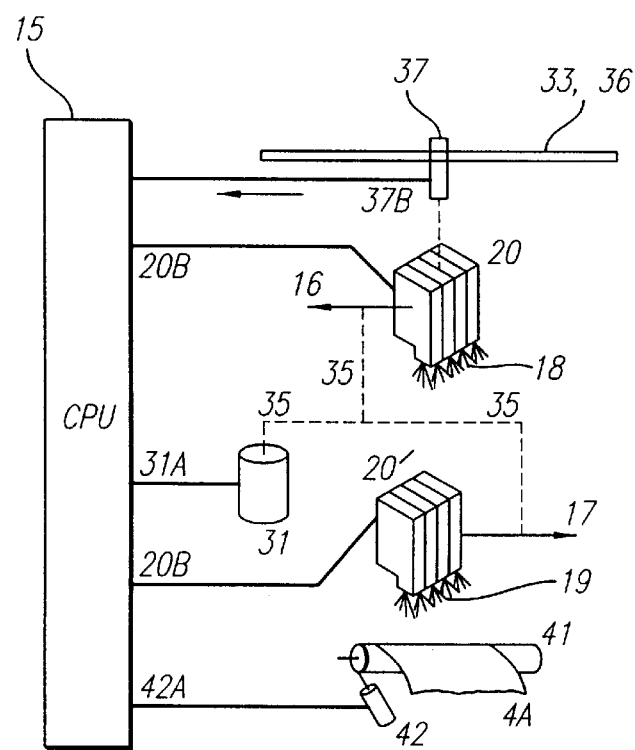
FIG. 1A is a highly schematic block diagram of the same product, particularly showing key signals flowing from and to a digital electronic central microprocessor, to effectuate printing while the pens travel in each of two opposite directions—an arrangement which, with respect to the present invention, is part of the best mode of practice, but nevertheless optional.

Within the case 1 and pods 3, 13 the carriage assembly 20 (FIG. 2) is driven in reciprocation by a motor 31—along dual support and guide rails 32, 34—through the intermediary of a drive belt 35. The motor 31 is under the control of signals 31A from a digital electronic microprocessor 17 (FIG. 1A).

In a block diagrammatic showing, the carriage assembly is represented separately at 20 when traveling to the left 16 while discharging ink 18, and at 20' when traveling to the right 17 while discharging ink 19—thus illustrating that the preferred embodiment of the invention prints while traveling in each of its two scanning directions. As mentioned earlier, however, this feature is at present regarded as part of the best mode of practice of the present invention but not as a limitation upon the invention itself.

A very finely graduated encoder strip 33 is extended taut along the scanning path of the carriage assembly 20, 20', and read by an automatic optoelectronic sensor 37 to provide position and speed information 37B for the microprocessor 15. (In the block diagram all illustrated signals are flowing from left to right except the information 37B fed back from the sensor—as indicated by the associated leftward arrow.) The codestrip 33 thus enables formation of color inkdrops at ultrahigh precision (as mentioned earlier, typically 24 pixels/mm) during scanning of the carriage assembly 20 in each direction—I.e., either left to right (forward 20') or right to left (back 20).

Figure 3:
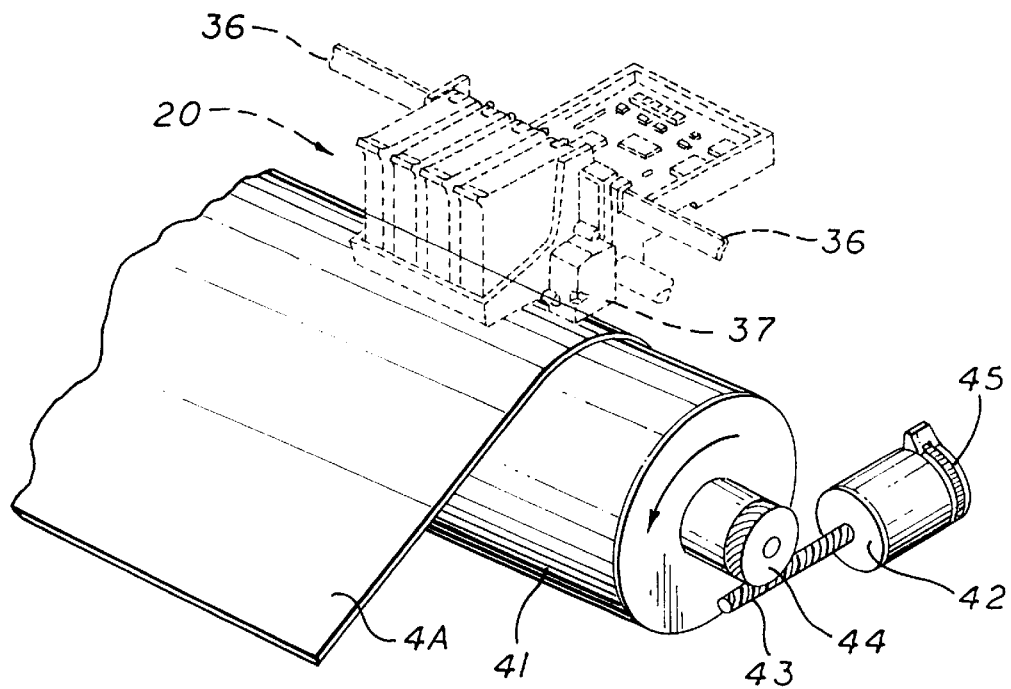
FIG. 3 is a like view of a printing-medium advance mechanism which is also mounted within the case or cover of the FIG. 1 device, in association with the carriage as indicated in the broken line in FIG. 3.

A currently preferred location for the encoder strip 33 is near the rear of the carriage tray (remote from the space into which a user's hands are inserted for servicing of the pen refill cartridges). Immediately behind the pens is another advantageous position for the strip 36 (FIG. 3). For either position, the sensor 37 is disposed with its optical beam passing through orifices or transparent portions of a scale formed in the strip.

A cylindrical platen 41—driven by a motor 42, worm 43 and worm gear 44 under control of signals 42A from the processor 15—rotates under the carriage-assembly 20 scan track to drive sheets or lengths of printing medium 4A in a medium-advance direction perpendicular to the scanning. Print medium 4A is thereby drawn out of the print-medium roll cover 4, passed under the pens on the carriage assembly 20, 20' to receive inkdrops 18, 19 for formation of a desired image, and ejected into the print-medium bin 5.

Figure 4:
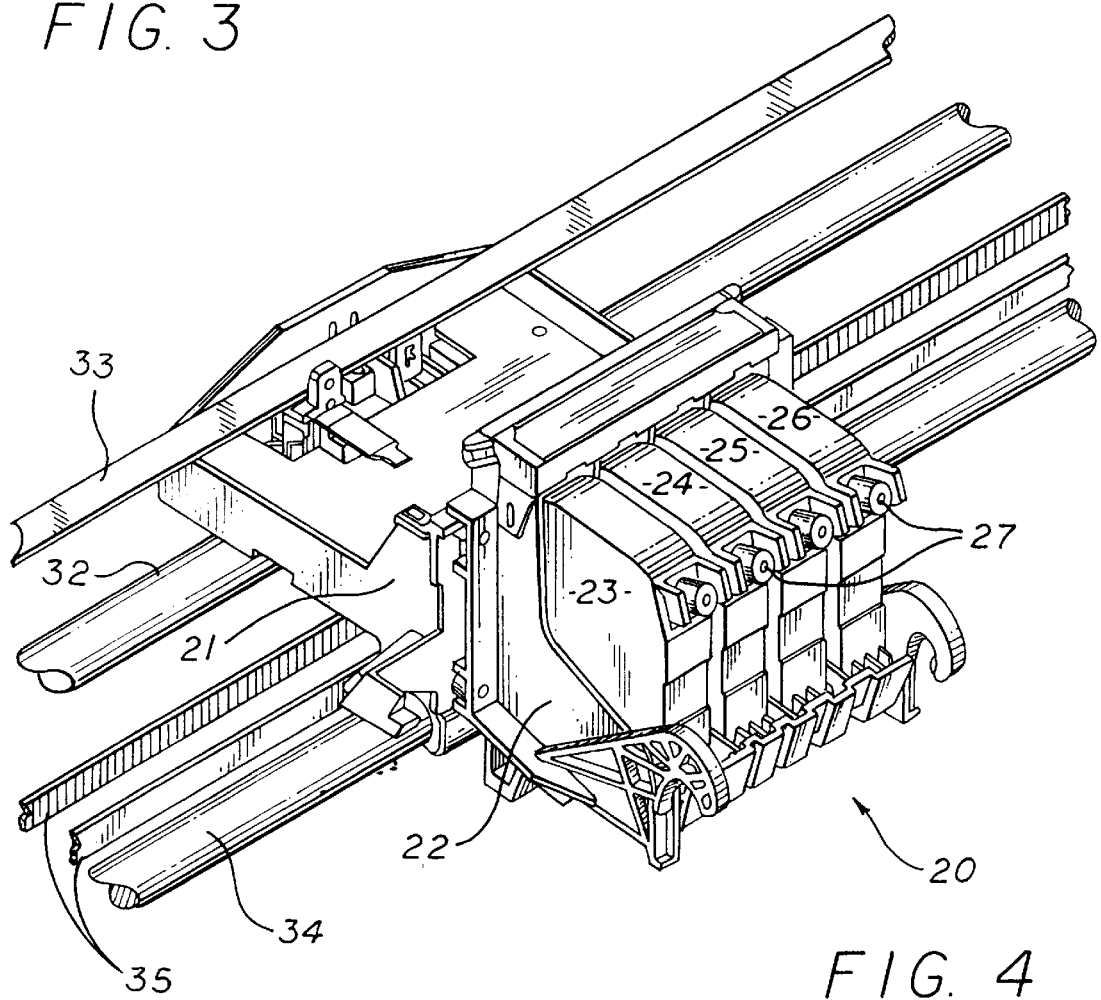
FIG. 4 is a like but more-detailed view of the FIG. 2 carriage, showing the printhead means or pens which it carries.

The carriage assembly 20, 20' includes a previously mentioned rear tray 21 (FIG. 4) carrying various electronics. It also includes bays 22 for preferably four pens 23–26 holding ink of four different colors respectively—preferably yellow in the leftmost pen 23, then cyan 24, magenta 25 and black 26.

Figure 5:
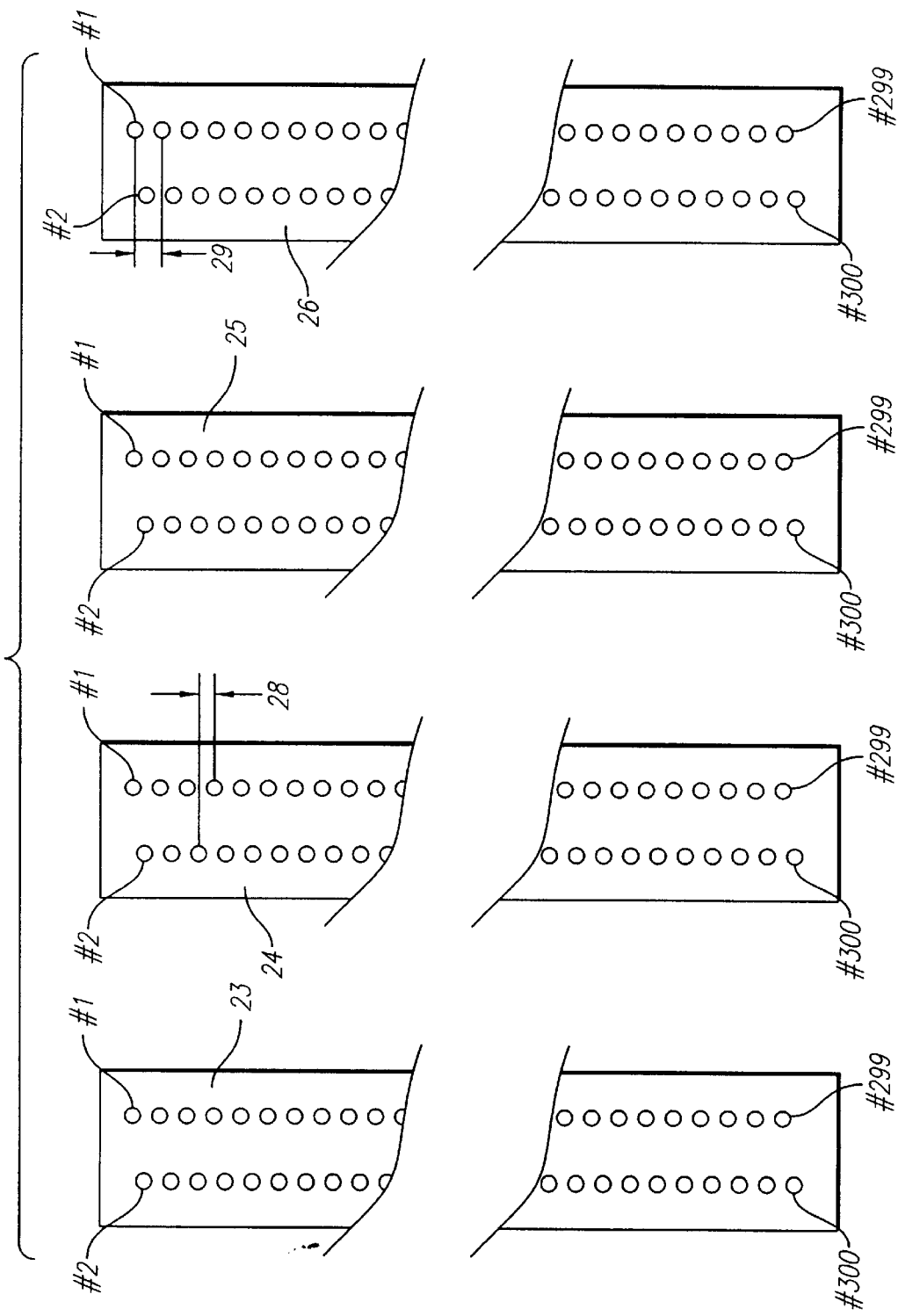
FIG. 5 is a bottom plan of the pens, showing their nozzle arrays.

Each of these pens, particularly in a large-format printer/plotter as shown, preferably includes a respective ink-refill valve 27. The pens, unlike those in earlier mixed-resolution printer systems, all are relatively long and all have nozzle spacing 29 (FIG. 5) equal to one-twelfth millimeter—along each of two parallel columns of nozzles. These two columns contain respectively the odd-numbered nozzles 1 to 299, and even-numbered nozzles 2 to 300.

The two columns, thus having a total of one hundred fifty nozzles each, are offset vertically by half the nozzle spacing, so that the effective pitch of each two-column nozzle array is approximately one-twenty-fourth millimeter. The natural resolution of the nozzle array in each pen is thereby made approximately twenty-four nozzles (yielding twenty-four pixels) per millimeter.

Figure 6:
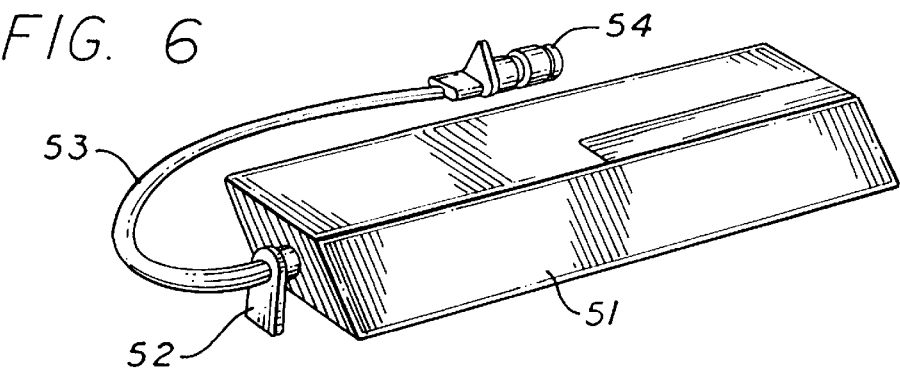
FIG. 6 is a perspective or isometric view of an ink-refill cartridge for use with the FIG. 4 and 5 pens.

For resupply of ink to each pen the system includes a refill cartridge 51 (FIG. 6), with a valve 52, umbilicus 53 and connector nipple 54. The latter mates with supply tubing within the printer/plotter refill station (in the left-hand pod 3).

Figure 7:
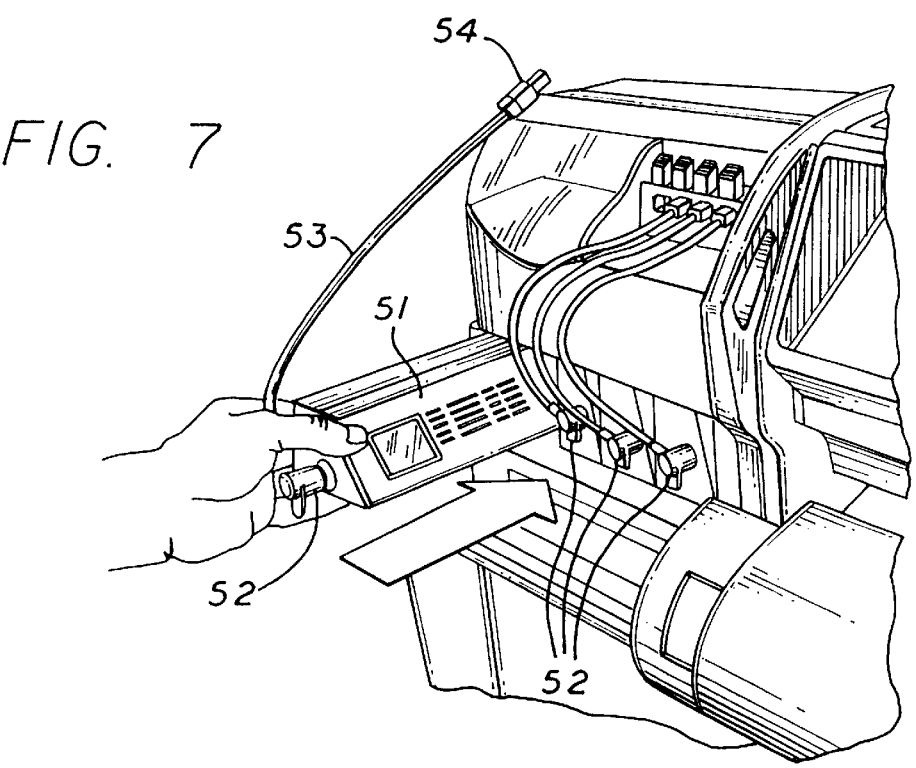
FIG. 7 is a like view showing several refill cartridges (for different ink colors) according to FIG. 6 in, or being installed in, a refill-cartridge station in the left end of the case in the FIG. 1 device.

Each supply tube in turn can complete the connection to the previously mentioned refill valve 27 on a corresponding one of the pens, when the carriage is halted at the refill station. A user manually inserts (FIG. 7) each refill cartridge 51 into the refill station as needed.

In the preferred embodiment of the invention, printing is bidirectional. In other words, consecutive passes are printed 19, 18 while traveling in both directions, alternating left-to-right scans 17 with right-to-left 16.

Preferably black (or other monochrome) and color are treated identically as to speed and most other parameters—particularly including those pertinent to undercolor replacement. In the preferred embodiment the number of printhead nozzles used is always two hundred forty, out of the three hundred nozzles (FIG. 5) in the pens.

This arrangement allows, inter alia, for software/—firmware adjustment of the effective firing height of the pen over a range of ±30 nozzles, at approximately 24 nozzles/mm, or ±30/24=1¼ mm, without any mechanical motion of the pen along the print-medium advance direction. Alignment of the pens can be checked automatically, and corrected through use of the extra nozzles. As will be understood, the invention is amenable to use with a very great variety in the number of nozzles actually used.

The system of the preferred embodiment has three printing speed/quality settings, which determine resolution, number of passes to complete inking of each swath (or more precisely each subswath), and carriage velocities as approximately:

|  | best quality | normal | fast |
|---|---|---|---|
| resolution (pixels/mm) | 24 | 12 | 12 |
| passes to complete swath | 8 or 10 | 4 or 6 | 2 |
| carriage velocity (cm/sec) | 51 or 63½ | 63½ | 63½. |

Figure 8:
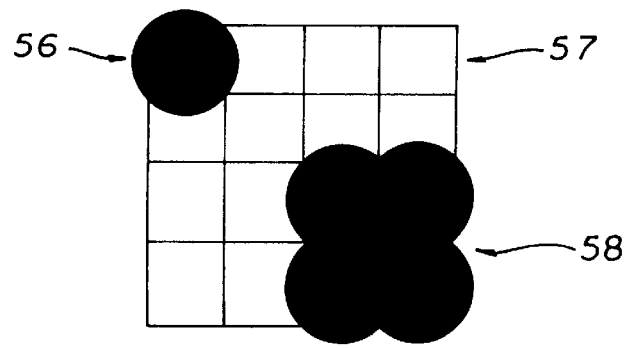
FIG. 8 is a very highly enlarged schematic representation of two usage modes of the ultrahigh-resolution dot forming system of the present invention.

The varying choices indicated here are for correspondingly various media—for example carriage velocity is 63½ cm/sec, except that 51 cm/sec is used for best-quality printing on glossy stock. Resolution is the same in both horizontal and vertical directions, I.e. row and column spacings are the same so that pixels 57 (FIG. 8) are 24 mm square for all settings.

All printing, even the lower-resolution (12 pixel/mm) operation, is actually controlled and produced on the high-resolution (24-by-24 pixel/mm) grid. High-resolution printing, however, calculates the inking for each position in the grid independently, and implements that inking independently with one or more inkdrops 56 in each pixel.

Low-resolution printing instead calculates the inking only for every other position in the grid (along each of the perpendicular axes or dimensions) and implements that inking with one or more double-height, double-width compound inkdrop structures 58—each made up of a two-by-two assemblage of individual inkdrops. Since calculations are done for only half the rows and half the columns, the number of points calculated is just one quarter of all the points in the grid.

2. PRINTMODES AND PRINTMASKS

A "printmode" is the definition of how ink is laid on media for a given combination of ink, printing-medium type, print-quality setting and language. This essentially defines a choice between image quality and throughput (number of pages, or length of printed sheet, per unit printing time) for a given set of these parameters.

The definition consists of specifying the values of numerous parameters, including:

directions (unidirectional or bidirectional), number of passes needed to completely print a swath,
  how the media is advanced between passes, resolution (e.g., 12 or 24 pixels/mm), carriage speed while printing, printmasks (passes assigned to print each pixel), amount of ink (e.g., one or two hundred percent), and number of printhead nozzles used (trading off shorter print times against printing quality).

In addition to the set of predefined printmodes, preferred embodiments of the invention allow third-party software developers to develop other printmodes—thereby facilitating software support of new printing media, or of different combinations of image quality and throughput.

As stated above, a "printmask" is a binary pattern that establishes exactly which pass or passes are allocated to printing of each pixel—or, conversely, which pixels are printed in each pass. In a ten-pass printmode, ten passes of the printhead carriage are required to complete each sub-swath; therefore, to maximize spreading of the inking among passes, each pass should print roughly one-tenth of the total dots.

A printmask for each pass specifies which pixels are addressed in that pass, and (usually indirectly) by which printhead nozzles. The printmask technique is used to mix up the nozzles used to reduce undesirable visible printing artifacts such as banding.

Figure 9:
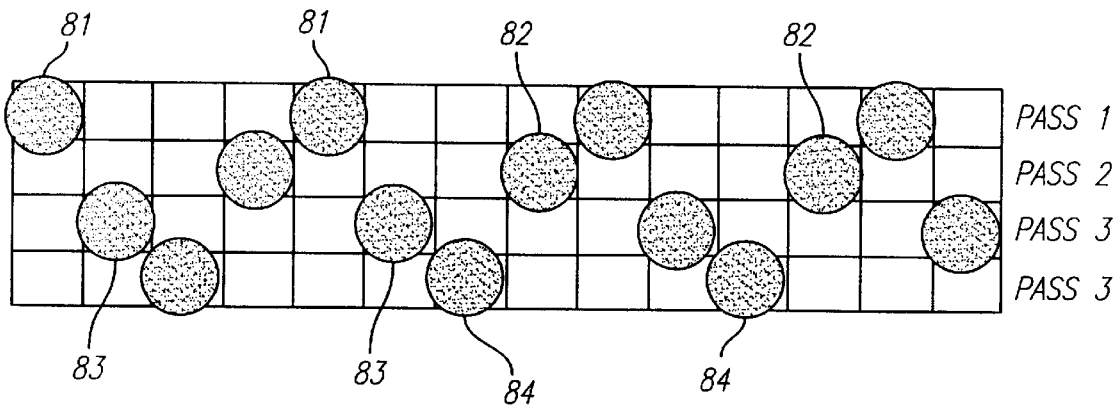
FIG. 9 is a diagram showing elemental features of a printmask.

Preferred embodiments of the invention employ two main mask types: "one out of four" for print-quality settings denominated "fast" and "normal"; and "one out of eight" for "best". In a one-out-of-four mask, dots 81 (FIG. 9) in the first row—and printed in the first pass—are three pixels apart, or in other words printed in one out of every four pixels in the row.

Like spacing is used in each of the other rows, as shown, but the positions are sequenced in a jumbling sort of fashion to minimize patterning. The indicated mask (representing operation of just one nozzle) is used with a "normal" print-quality setting, for both glossy and matte media.

3. GRAY RAMP WITH UNDERCOLOR REMOVAL & BLACK REPLACEMENT

Figure 10:
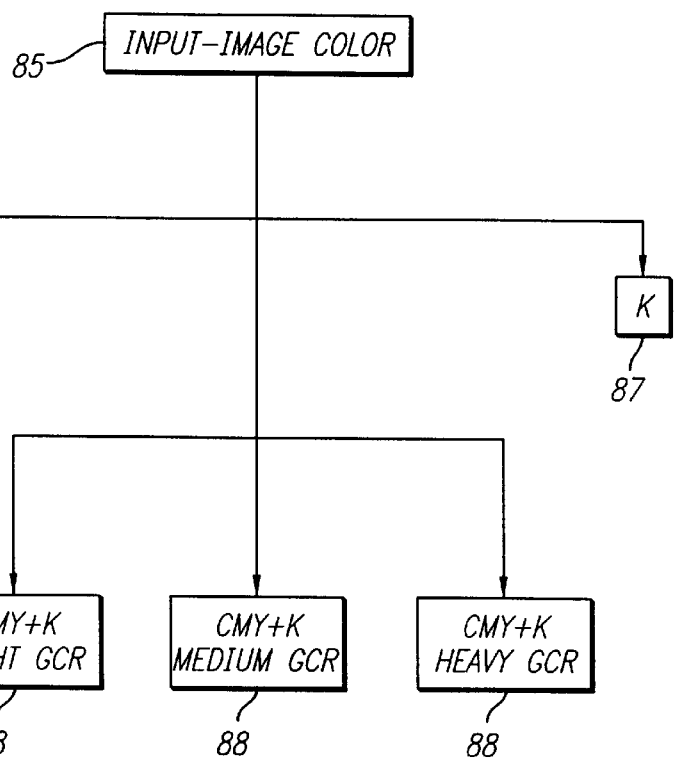
FIG. 10 is a diagram suggesting how input-image color is used in deriving an undercolor-replacement hierarchy.

Construction of a gray ramp or continuum from a given input-image color 85 (FIG. 10) may be symbolized by a succession of blocks 88, ranging from "CMY" meaning all chromatic-color inks 86 to "K" meaning all black ink 87. From the all-CMY end of this series, steps 88 along the way to all-K include progressive gray-component removal (GCR) which progressively reduces the amount of chromatic-color ink while progressively increasing the amount of black. The size of the letters "CMY" and "K" in the accompanying diagram is intended to suggest this continuum.

Figure 11:
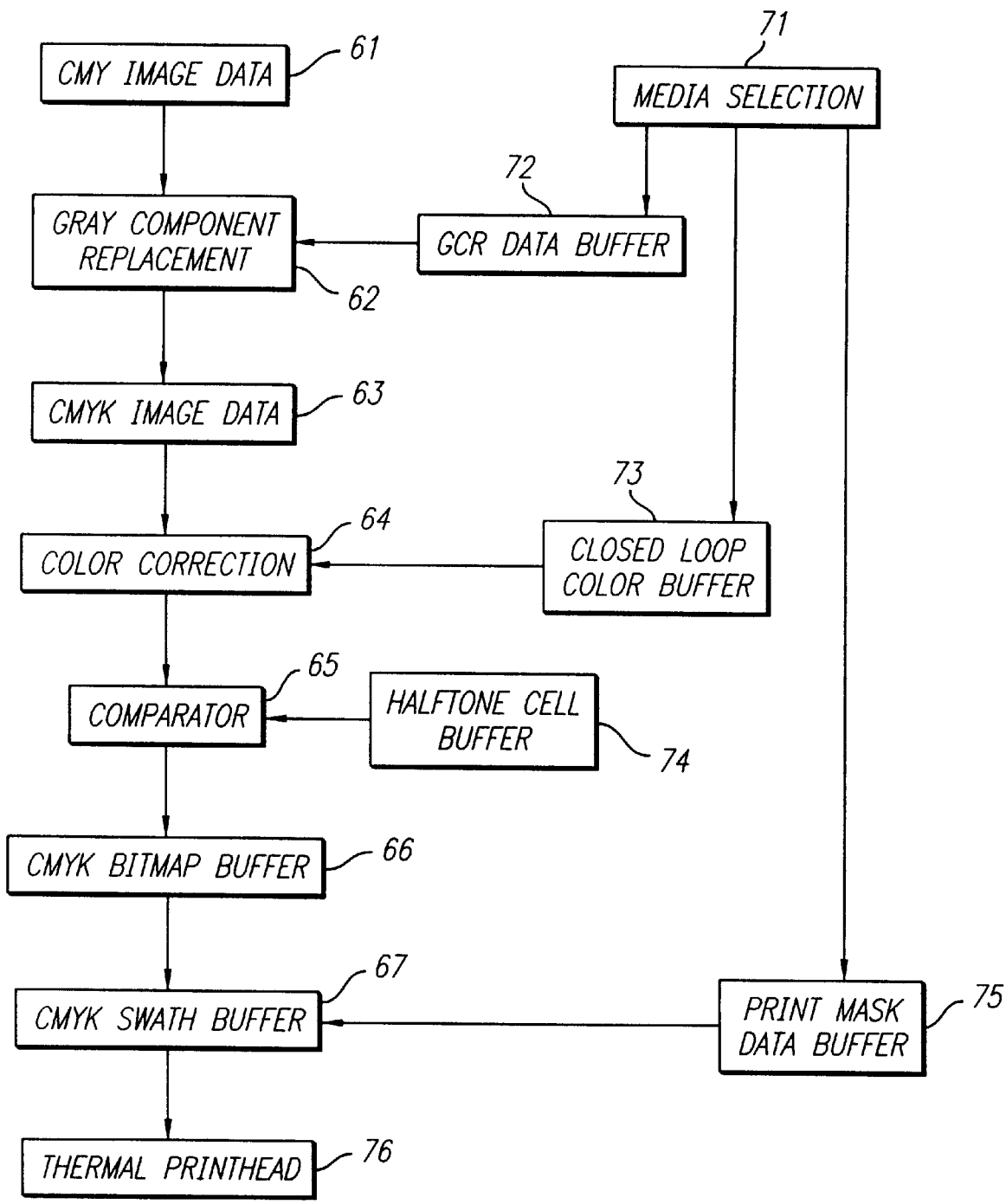
FIG. 11 is an overall block diagram showing hardware elements of the system microprocessor, and related memory and control-panel features.
Figure 12:
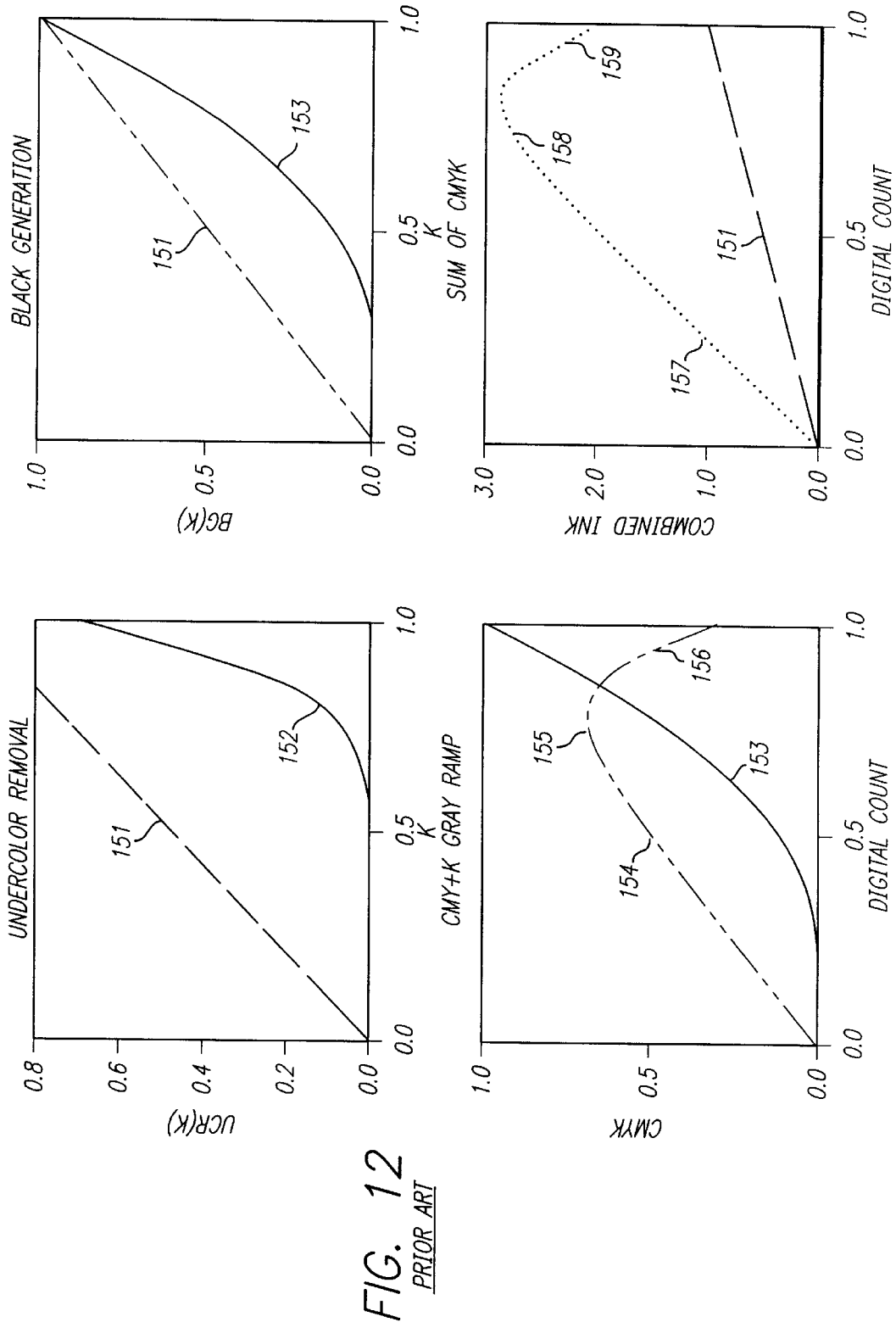
FIG. 12 is a set of four graphs exhibiting undercolor-removal and black-generation relationships in a previously established commercial product.
Figure 13:
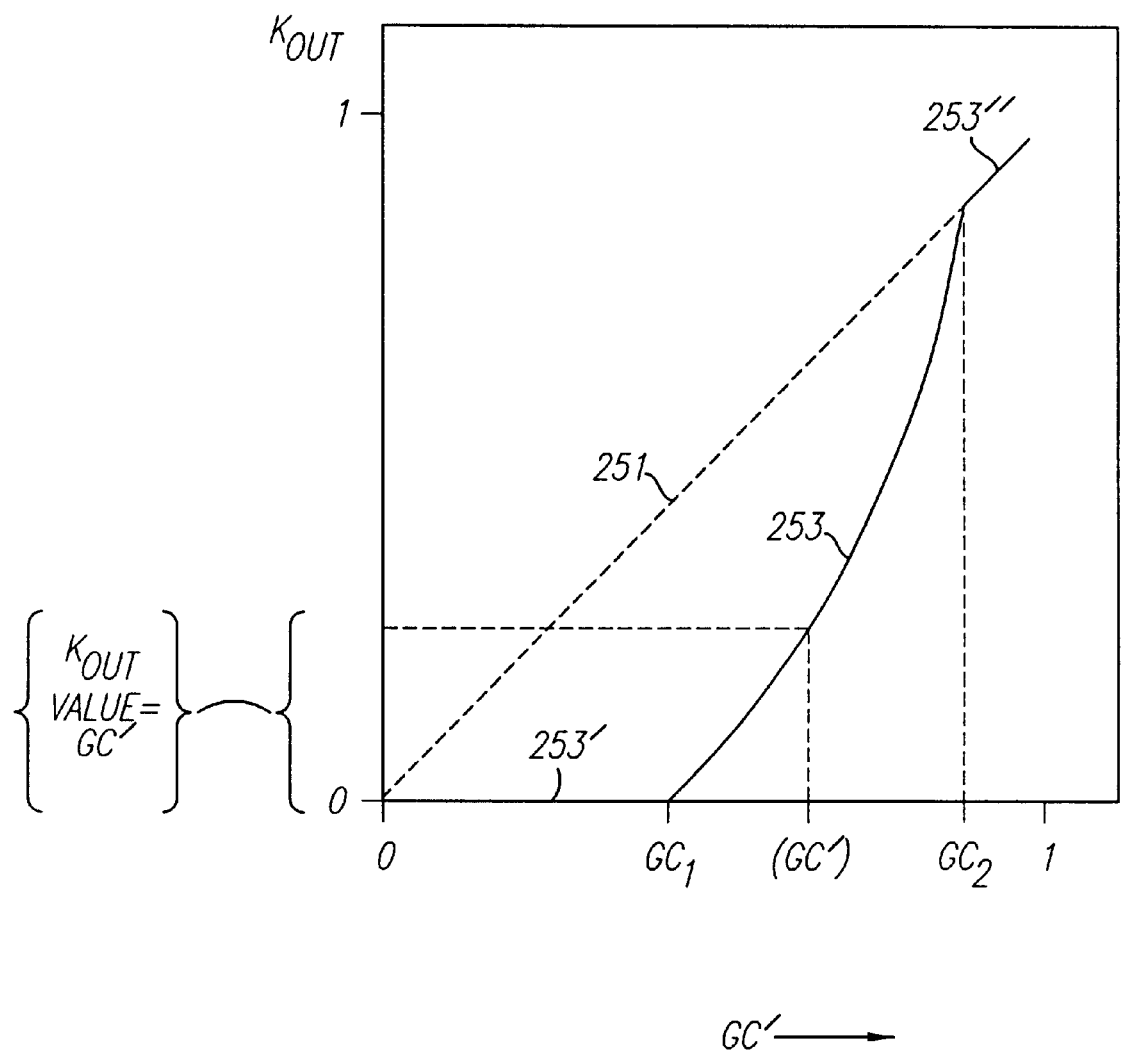
FIG. 13 is a graph after Motta et al., in their patent mentioned earlier, showing undercolor-to-black removal relationships in accordance with their invention.

This process is performed by a module 62 (FIG. 11). That module, typically portions of a microprocessor plus complementary memory, may be seen as part of a larger picture in the hardware of an inkjet printer—including equipment 61 that receives desired-image information and a device 71 that accepts a user's designation 71 of an intended printing medium, through numerous other known modules 63 to 75, to the output printheads 76.

The diagram may also be taken as representing operational flow, for digital color image processing. The CMY data, output by color rendering dictionaries, are passed through GCR 62, color correction 64, halftoning 65 and the printmode printmask 75. Each step has a corresponding data buffer 72–75, and all but halftoning allow for media-dependent selection of the data buffer.

4. UNDERCOLOR REMOVAL

Figure 14:
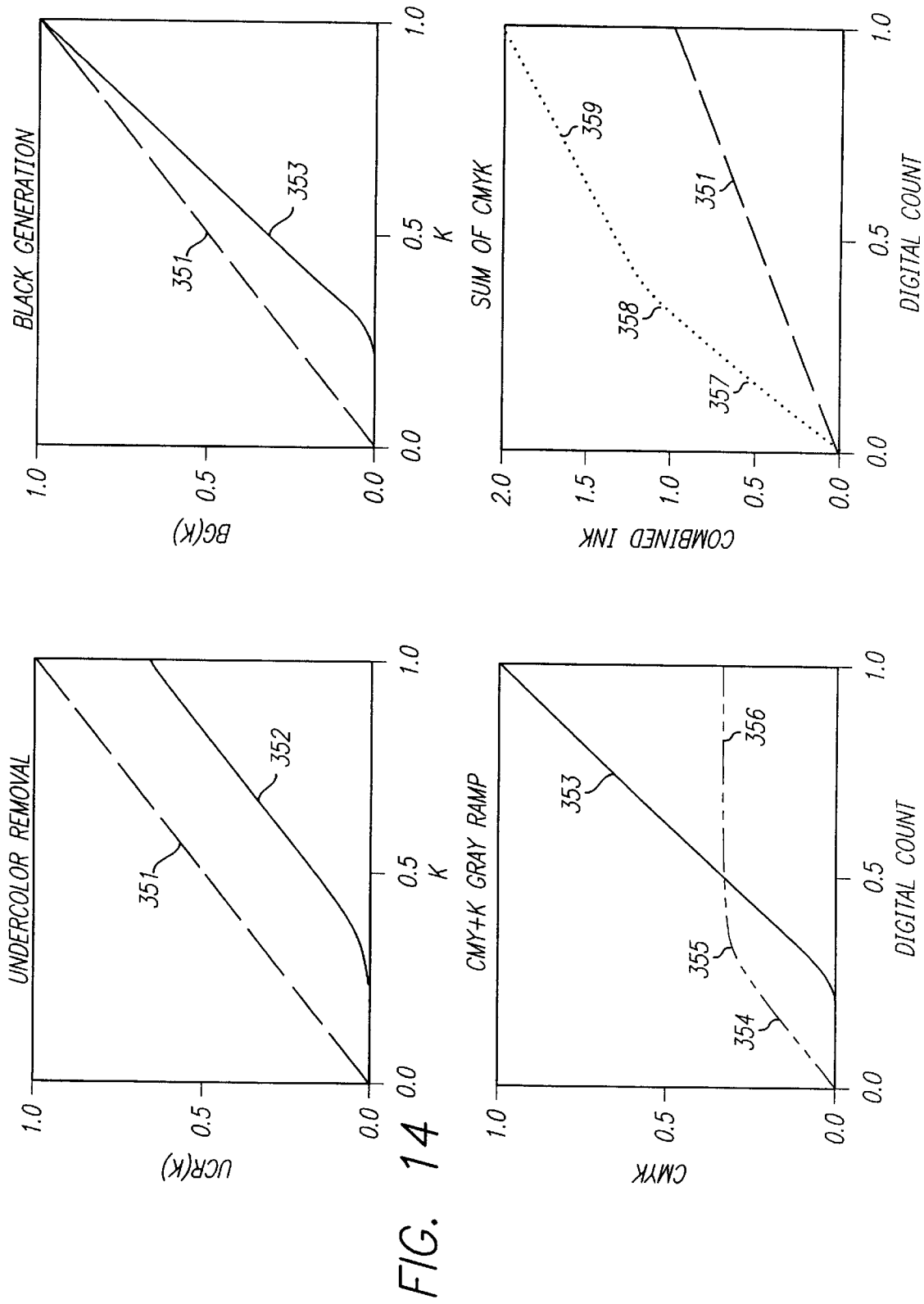
FIG. 14 is a set of four graphs like FIG. 12, but for the present invention.

In accordance with the invention as outlined above, removal of the undercolor or gray component 351 (FIG. 14) does not begin until that component reaches a threshold value, about twenty-seven percent of maximum. At that point, the removal portion 352 begins very slowly and smoothly to rise from zero—starting as a gently curving toe of the curve 352. That curve represents the amount of cyan, magenta and yellow subtracted from composite colors, including black, as a function of the input undercolor gray k plotted along the abscissa.

Soon, however, that removal portion 352 takes on (at about forty percent of maximum) a very nearly linear function—thus paralleling the identity line 351. in consequence the remainder function 354–356 begins in an initial region 354 that very closely tracks the linear identity line 351, but at the threshold rolls over 355 very smoothly to follow a substantially horizontal path 356.

Thus the amount of gray component that is allowed to remain as undercolor (CMY inking) is essentially constant above about forty percent of maximum. More specifically, that essentially constant value is approximately one-third of nominal (single drop per pixel) primary-color inking, and as will be understood this is amount of ink for each one of the three CMY colorants. Therefore the total ink laid down in those three dyes equals the nominal, I.e. is one hundred percent of normal inking.

It is believed that no undercolor-control system heretofore has followed such a paradigm—or has provided a smooth, spline-contoured "toe" as described above, to maintain in the printed output a coherent, orderly and visually pleasing tonal-gradation response to varying input-shade signals in the threshold region.

5. BLACK GENERATION

The smooth early toe and constant later characteristic, however, are far from the only novelties of the present invention. Another is that black generation 353 does not simply equal the amount of removed gray component—though it does have certain related advantageous properties, in particular a spline-controlled smooth toe, and a consistent slope over a broad dynamic range. The black-generation function 353 represents the amount of black added to composite colors, including all the grays, concurrently with the removal of the undercolor portion as discussed above.

Instead of merely tracking removed gray component as generally practiced heretofore, the black-generation function 353 is instead separately calculated to provide a response that rises at a substantially consistent slope and over a very broad range of input-undercolor values, to reach full (one hundred percent) black at one hundred percent input.

This black-generation function 353 is carefully tooled to complement the undercolor remainder 356 in desirable ways that can be particularly appreciated through consideration of the combined-inking function 357–359. That function represents the sum of the undercolor remainder 354–356 and black-generation 353 functions.

6. COMBINED INKING (a) *Desirable maximum black level*—First, the total black at maximum gray component is two hundred percent of nominal (single drop) inking—one half of this being black ink 353, and the other half being three times the one-third level of the remainder plateau 356 mentioned above. This maximum value is believed to be ideal, for several reasons:

It is equal to the amount of ink ordinarily printed for a secondary color and so satisfies a certain symmetry of inking utilizations.

It is considerably higher than the one hundred ten percent figure of Motta—which may be a somewhat weak black for best esthetic results.

It is also very meaningfully lower than the three hundred percent black of the earlier product discussed above.

Thus the maximum black provided by the present invention is high enough in opacity and "snap" to satisfy the critical eye—but low enough in liquid loading to meet such practical concerns as drying time, throughput, after-drying flatness of the resulting printout, and minimal distortion at page bottom due to drying defects.

(b) *Smoothly graduated monotonic response*—Second, while the response function in total inking does have a very gently curving knee 358—enabling a relatively steep initial inking function 357 for good contrast to separate detail in highlight regions—it does not exhibit any hump such as described earlier for systems introduced heretofore. In other words the inking is monotonic in input gray component.

Furthermore both of its generally linear regions 357, 359, and even the smooth knee 358, extend in a relatively consistent fashion over broad regions of the input gray-component range. Because of this uniformity there is virtually no opening for color artifacts of opportunity to arise—through uncontemplated interplay between the inking response function and the electronic, atmospheric, paper, and ink parameters of the instant.

These characteristics are important to avoid fussiness in control of the system response in the face of inkpaper interactions, atmospherics etc. as mentioned earlier. In short, the system response 357–359 exhibits the extremely valuable property of fault tolerance, or rugged resistance to operating conditions that happen not to meet design specifications.

Although the present invention operates at a threshold of about twenty-seven percent, actually a somewhat higher value (even as high as the threshold used by Motta et al.) would not in itself be adverse and in some circumstances might even be favorable. What does matter is that a relatively broad range above the threshold—and beyond the knee—be reserved for a plateau and for consistent ramping that facilitate the fault-tolerant operation.

7. COMPUTATIONS

Gray-color removal implementations may proceed in a variety of ways. Multidimensional lookup tables (FIG. 15, at left) are particularly suited to calibrated or CIE-based color spaces. One-dimensional tables are appropriate for uncalibrated red, green and blue (RGB) spaces.

The processing sequence starts with eight-bit CMY data and uses the undercolor-removal algorithm to subtract an amount from the CMY planes. Next the black is added according to the black-generation function. The final maximum black point is one hundred percent black plus thirty-three percent each of cyan, magenta and yellow.

This allows a better black than using only one hundred percent black, but also does not permit excessive ink levels such as three or four hundred percent ink. Since only CMY are used in the highlights, the lighter composite grays appear less grainy.

Figure 17:
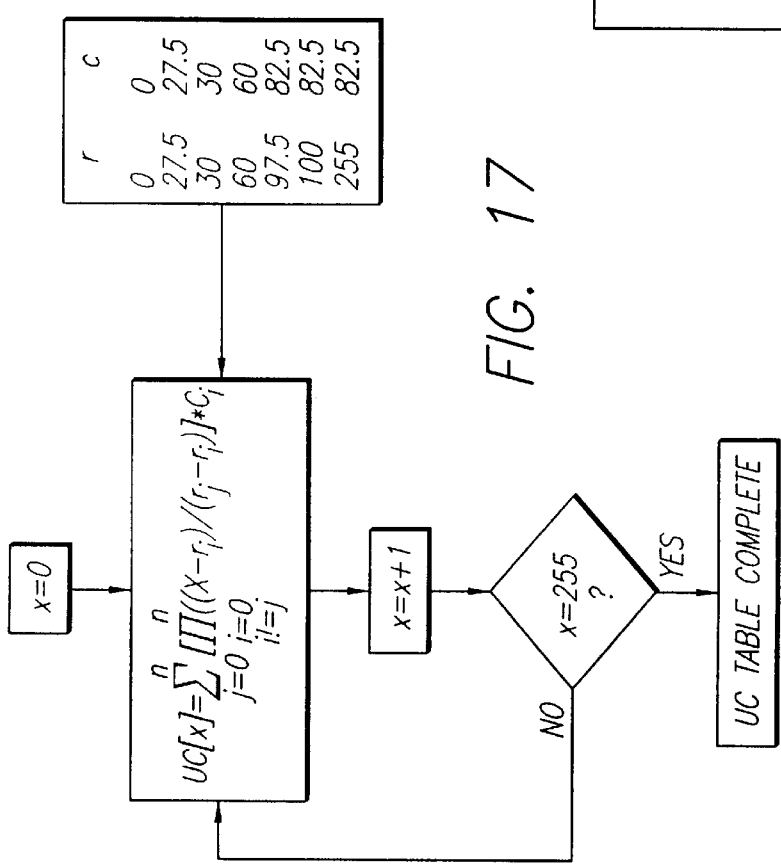
FIG. 17 is a flow chart showing how the FIG. 16 "UC" table is generated.

Undercolor or gray component x (FIG. 16) is itself calculated straightforwardly as the minimum of the three subtractive primaries in use. The undercolor-remainder fraction u (corresponding to 354–356 in FIG. 14), however, in preferred embodiments of the present invention is advantageously calculated using spline techniques as summarized in FIG. 17.

In those calculations (and those for black) the generalized products $[(x-r_i)/(r_j-r_i)] \cdot c_i$ are treated in accordance with modern spline practice, the subscripts j and I ranging from 0 to n with I!=j as indicated, and the coefficients r and c being selected successively from the values tabulated in the right-hand box. These computations yield the carefully tailored "toe" region noted earlier, and a nearly linear response thereafter.

Figure 18:
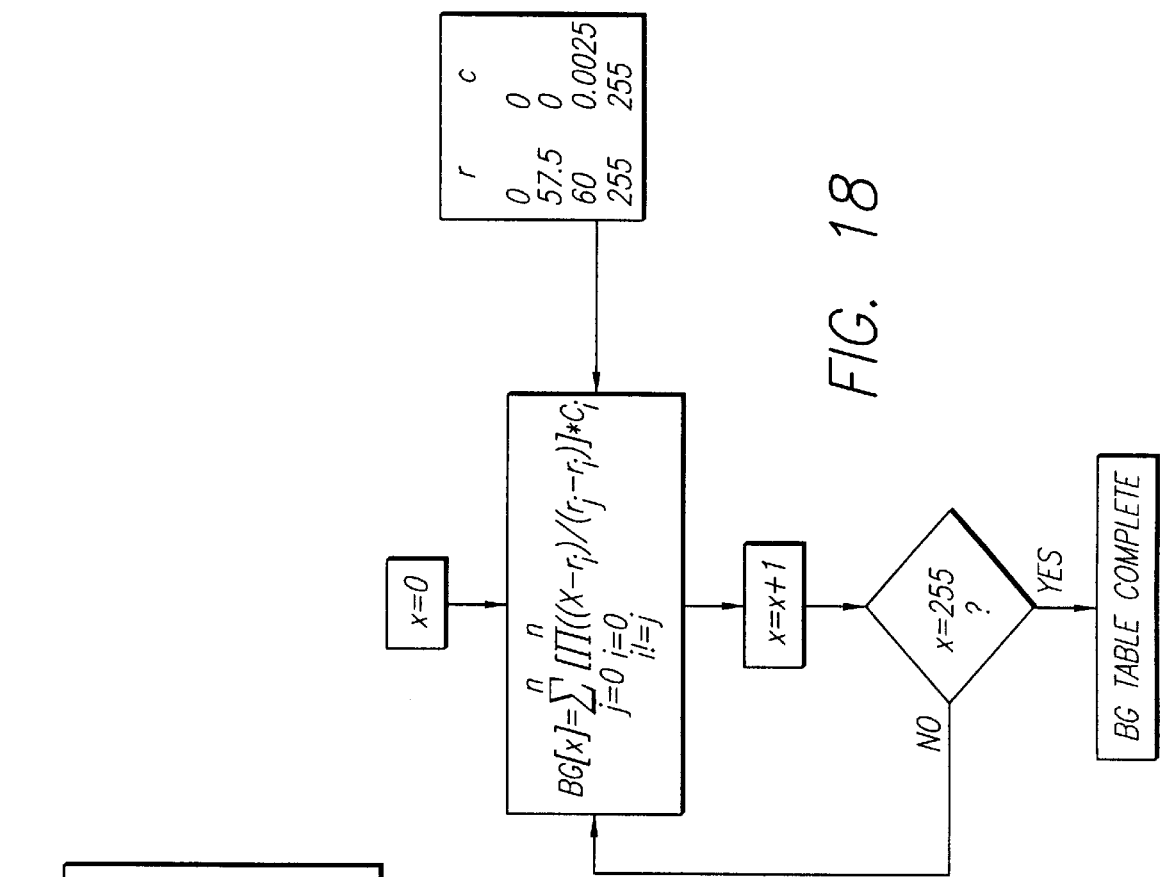
FIG. 18 is a flow chart showing how the FIG. 16 "BG" table is generated.

The resulting values x and u are used in the final rank of calculations (FIG. 16) to derive the chromatic-color amounts C, M and Y to be actually inked. The black generation block K=BG(x) in that same final rank follows another spline-controlled course (FIG. 18). Preferably both u and k are precalculated and stored in lookup tables for most-expeditious real-time operations later.

The invention uses a 24 pixel/mm (600 dpi) gray-component replacement strategy to achieve minimal ink usage consistent with an optimal black, and to linearize the composite grays. The overall result is an ink-limited black, but having composite blacks made of only CMY in the highlights and CMYK in the midtones and shadows.

In those of the accompanying claims which are directed to apparatus, a verbal convention has been adopted to make particularly distinct and clear which features mentioned in the claims are elements of the claimed invention and which features (first mentioned in the preamble) are instead recited as parts of the environment in which the invention exists and operates. Specifically, in referring back to parts of the environment, consistently the word "such" is used instead of the word "the" or "said". A common, unitary antecedent is intended: in other words, the term "such" is to be understood (as are "the" and "said") as a definite article, referring back to a particular element of the environment that is the same element whenever referred to.

The above disclosure is intended as merely exemplary, and not to limit the scope of the invention—which is to be determined by reference to the appended claims.

What is claimed is:

1. Apparatus for printing images on a printing medium by scanning inkjet printheads; said apparatus comprising:
   automatic means for receiving image data expressed as signals for at least chromatic colors;
   automatic means for determining a quantity of undercolor, if any, in the image;
   automatic means for reducing the chromatic-color signals and adding a signal for black, in amounts nonlinearly related to the quantity of undercolor;
   means for holding such printheads and translating such printheads across such printing medium; and
   automatic means for applying the reduced and added signals to control printing by such printheads;
   wherein said reducing and adding means cooperate with said applying means to produce total undercolor inking that is a substantially monotonic function of the quantity of undercolor.

2. The apparatus of claim 1, further comprising:
   storage means for holding automatic operating instructions for all of said means.

3. The apparatus of claim 1, wherein:
   the reducing and adding means operate in a subtractive-colorant color space.

4. The apparatus of claim 3, wherein:
   the subtractive-colorant space is cyan, magenta and yellow space, or cyan, magenta, yellow and black space.

5. The apparatus of claim 1, further comprising:
   means for accepting or generating color image information in terms of additive red, green and blue signals, and converting the red, green and blue signals into at least subtractive cyan, magenta and yellow signals for reception by said receiving means.

6. The apparatus of claim 1, wherein:
   the reducing and adding means operate only above an undercolor threshold of about twenty to thirty-five percent.

7. The apparatus of claim 1, wherein:
   said reducing and adding means cooperate with said applying means to produce total inking between one hundred fifty and two hundred fifty percent when the signals are all undercolor.

8. The apparatus of claim 1, wherein:
   the reducing and adding means cooperate with the applying means to begin undercolor-signal removal and black-signal addition with initially very gradual increases from a threshold.

9. The apparatus of claim 8, wherein:
   the gradual increases follow a spline function.

10. The apparatus of claim 1, wherein:
    said receiving means are adapted to receive a monochrome image, expressed as equal signals for three subtractive primary colors; and
    said reducing and adding means operate upon the monochrome image in the same way as a color image.

11. Apparatus for printing images on a printing medium by scanning inkjet printheads; said apparatus comprising:
    automatic means for receiving image data expressed as signals for at least chromatic colors;
    automatic means for determining a quantity of undercolor, if any, in the image;
    automatic means for reducing the chromatic-color signals and adding a signal for black, in amounts related to the quantity of undercolor, without dithering on a color vector;
    means for holding such printheads and translating such printheads across such medium; and
    means for automatically applying the reduced and added signals to control printing by such printheads;
    wherein said reducing and adding means cooperate with said applying means to produce total inking between one hundred fifty and two hundred fifty percent of nominal full inking, when the signals are all undercolor.

12. The apparatus of claim 11, further comprising:
    storage means for holding automatic operating instructions for the receiving means, reducing and adding means, and applying means.

13. The apparatus of claim 11, wherein:
    such scanning inkjet printheads comprise plural inkjet pens holding respective colorants; and
    the applying means comprise means for applying the reduced chromatic-color signals and the introduced black signal to control respective ones of the pens.

14. The apparatus of claim 11, wherein:
    said receiving means is adapted to receive a monochrome image, expressed as equal signals for three subtractive primary colors; and
    said reducing and adding means operate upon the monochrome image in exactly the same way as a color image.

15. The apparatus of claim 11, further comprising:
    means for accepting or generating color image information in terms of additive red, green and blue signals, and converting the red, green and blue signals into subtractive cyan, magenta and yellow signals for reception by said receiving means.

16. A method for printing images on a printing medium by scanning inkjet printheads; said method comprising the steps of:
    automatically receiving image data, expressed as signals for at least chromatic colors;
    automatically determining a quantity of undercolor, if any, in the image;
    automatically reducing the chromatic-color signals and adding a signal for black, in amounts related to the quantity of undercolor, without dithering on a color vector; and
    automatically applying the reduced and added signals to control printing by such printheads;

wherein the reducing and adding steps cooperate with the applying step to begin undercolor-signal removal and black-signal addition with initially very gradual increases from a threshold that does not exceed about thirty-five percent undercolor.

17. The method of claim 16, further comprising the step of:

storing, in a nonvolatile memory medium, automatic operating instructions for the determining, reducing and applying steps.

18. The method of claim 16, wherein:

the gradual increases follow a spline function.

19. The method of claim 16, wherein:

said receiving step for further receiving a monochrome image, expressed as equal signals for three subtractive primary colors; and said reducing and adding steps operate upon the monochrome image in the same way as a color image.

\* \* \* \* \*